US010345969B1

(12) United States Patent
Kuefler

(10) Patent No.: US 10,345,969 B1
(45) Date of Patent: Jul. 9, 2019

(54) TOUCH SENSOR BEHIND EMISSIVE DISPLAYS

(71) Applicant: Rockwell Collins, Inc., Cedar Rapids, IA (US)

(72) Inventor: Alan M. Kuefler, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 38 days.

(21) Appl. No.: 14/921,259

(22) Filed: Oct. 23, 2015

(51) Int. Cl.
G06F 3/045 (2006.01)
G06F 3/044 (2006.01)
G06F 3/041 (2006.01)

(52) U.S. Cl.
CPC .............. *G06F 3/044* (2013.01); *G06F 3/045* (2013.01); *G06F 3/0412* (2013.01); *G06F 3/0414* (2013.01); *G06F 2203/04103* (2013.01)

(58) Field of Classification Search
CPC ........... G06F 3/041; G06F 3/044; G06F 3/045
USPC .................................................. 345/170–178
See application file for complete search history.

(56) References Cited

U.S. PATENT DOCUMENTS

| 8,451,249 | B2 | 5/2013 | Burns et al. | |
|---|---|---|---|---|
| 2008/0122315 | A1* | 5/2008 | Maruyama | G06F 3/016 310/314 |
| 2010/0310232 | A1* | 12/2010 | Iwase | G11B 27/34 386/241 |
| 2012/0242588 | A1* | 9/2012 | Myers | G06F 1/1637 345/173 |
| 2013/0100043 | A1* | 4/2013 | Kolbe | G06F 3/0488 345/173 |
| 2013/0145313 | A1* | 6/2013 | Roh | G06F 3/0481 715/802 |
| 2013/0321260 | A1* | 12/2013 | Joo | G09G 5/005 345/156 |
| 2014/0132528 | A1* | 5/2014 | Catton | G06F 3/016 345/173 |
| 2015/0187845 | A1* | 7/2015 | Kim | H01L 27/323 257/40 |
| 2015/0199093 | A1* | 7/2015 | Kuscher | G06F 3/0486 715/788 |

(Continued)

FOREIGN PATENT DOCUMENTS

JP WO 2015136411 A1 * 9/2015 ........... G06F 1/1652

*Primary Examiner* — Nelson M Rosario
*Assistant Examiner* — Andrew Lee
(74) *Attorney, Agent, or Firm* — Angel N. Gerdzhikov; Donna P. Suchy; Daniel M. Barbieri

(57) ABSTRACT

An emissive display unit for an avionics display system installable in an aircraft cockpit may incorporate a display substrate housing emissive devices and a sensor substrate bonded to the rear surface of the display substrate. The sensor substrate may include a network of touch sensors configured to receive touch commands applied to the front surface of the display substrate. The touch sensors of the sensor substrate may be connected to drive electronics via a network of interconnect traces routed behind the rear surface of the emissive display unit (i.e., the rear surface of the sensor substrate). The drive electronics may then display images on the front surface of the display substrate via the emissive devices, based on touch commands received through the touch sensors. The front or rear surface of the sensor substrate may include a fully or partially metallized layer to disperse heat from the emissive display unit.

20 Claims, 7 Drawing Sheets

(56) References Cited

U.S. PATENT DOCUMENTS

| | | | |
|---|---|---|---|
| 2015/0220119 A1* | 8/2015 | Seo | G06F 3/041 345/173 |
| 2015/0220120 A1* | 8/2015 | Lee | G06F 1/1652 345/173 |
| 2017/0023979 A1* | 1/2017 | Yamazaki | G06F 1/1652 |
| 2017/0199618 A1* | 7/2017 | Jamshidi-Roudbari | G06F 3/0412 |

* cited by examiner

TOUCH SENSOR BEHIND EMISSIVE DISPLAYS

CROSS-REFERENCE TO RELATED APPLICATIONS

The instant application is related to U.S. patent application Ser. No. 14/724,984 filed on May 29, 2015. Said U.S. Patent Application is herein incorporated by reference in its entirety.

BACKGROUND

Many large format avionics display systems incorporate touchscreen functionality, which allows a pilot to manipulate displayed images via direct finger contact with the display screen. Touchscreen functionality may be designed and built into a display system, but such a system is not retrofittable and must be highly customized, which is not ideal for lower-volume applications. In the alternative, touchscreen functionality may be implemented by applying touch sensors to the front surface of a display system. However, these touch sensors must be optically bonded to the front surface, which requires a clean room environment or presents the risk of contamination by foreign materials or other defects. In addition, as the touch sensors are bonded to the front surface of the display system (i.e., the surface proximate the pilot or viewer), the likelihood increases of the touch sensors adversely affecting image quality (ex.—reflectance, luminance) if expensive transparent materials are not used.

Further, digital resistive touch sensors commonly used for touchscreen applications require a border area around the perimeter of the display screen for connecting the touch matrix to the display drive electronics and controller system. This border area may create additional packaging cost and complexity while increasing display bezel width and constraining the use of large format display systems in smaller cockpits where available space is at a premium. It may therefore be desirable for a large format avionics display system to implement touchscreen functionality via sensors fixed to the rear surface of the display unit (i.e., the surface opposite the pilot or viewer).

SUMMARY

In one aspect, embodiments of the inventive concepts disclosed herein are directed to an emissive display unit. For example, the emissive display unit may include a display substrate having a plurality of organic light emitting diodes (OLED) or other emissive devices, the emissive display unit configured to display images on the front surface (i.e., the surface facing the pilot or viewer) of the display substrate. The display substrate may have a rear surface in addition to the front surface. The emissive display unit may include a sensor substrate having a front surface and a rear surface, the front surface of the sensor substrate coupled to the rear surface of the display substrate. The sensor substrate may include one or more touch sensors configured to respond to a pressure contact with the front surface, the pressure contact associated with one or more fingers, gloved fingers, styli, or similar objects. The pressure contact may include tapping one or more fingers/objects to the front surface of the display substrate, touching and holding one or more fingers/objects to the front surface of the display substrate, and sliding one or more fingers/objects along the front surface of the display substrate. The images displayed may be based at least on the pressure contacts with the front surface of display substrate, as detected by the touch sensors. The emissive display unit may include touchscreen drive electronics coupled to the touch sensors by interconnect traces. The front or rear surfaces of the sensor substrate may include metallic layers configured to disperse heat from the display substrate. The display substrate and sensor substrates may include flexible or curved, non-planar substrates.

In a further aspect, the inventive concepts disclosed herein are directed to an avionics display system including one or more emissive display units as described above, the emissive display units coupled to one or more sets of touchscreen drive electronics coupled to the touch sensors of the sensor substrate of each emissive display unit by interconnect traces, each emissive display unit configured to display images on the front surface of its respective display substrate via the emissive devices included therein.

In a still further aspect, the inventive concepts disclosed herein are directed to a method for repurposing an emissive display unit for touchscreen functionality. The emissive display unit may include a display substrate having a plurality of OLEDs or other emissive devices, the emissive display unit configured to display images on the front surface of the display substrate via the plurality of emissive devices. The method may include coupling the front surface of a sensor substrate to the rear surface of the display substrate. The sensor substrate may include touch sensors configured to respond to pressure contacts with the front surface of the display substrate. The method may further include applying at least one metallic layer to at least one of the front and rear surface of the sensor substrate, the metallic layer thermally couplable to the display substrate.

BRIEF DESCRIPTION OF THE DRAWINGS

The inventive concepts disclosed herein may be better understood by those skilled in the art by reference to the accompanying figures in which.

DETAILED DESCRIPTION

Features of the inventive concepts disclosed herein in their various embodiments are exemplified by the following descriptions with reference to the accompanying drawings, which describe the inventive concepts with further detail. It is to be understood that both the foregoing general description and the following detailed description are exemplary and explanatory only and are not necessarily restrictive of the inventive concepts disclosed and claimed herein. These drawings depict only exemplary embodiments of the inventive concepts, and should not be considered to limit their scope in any way.

Figure 1A:
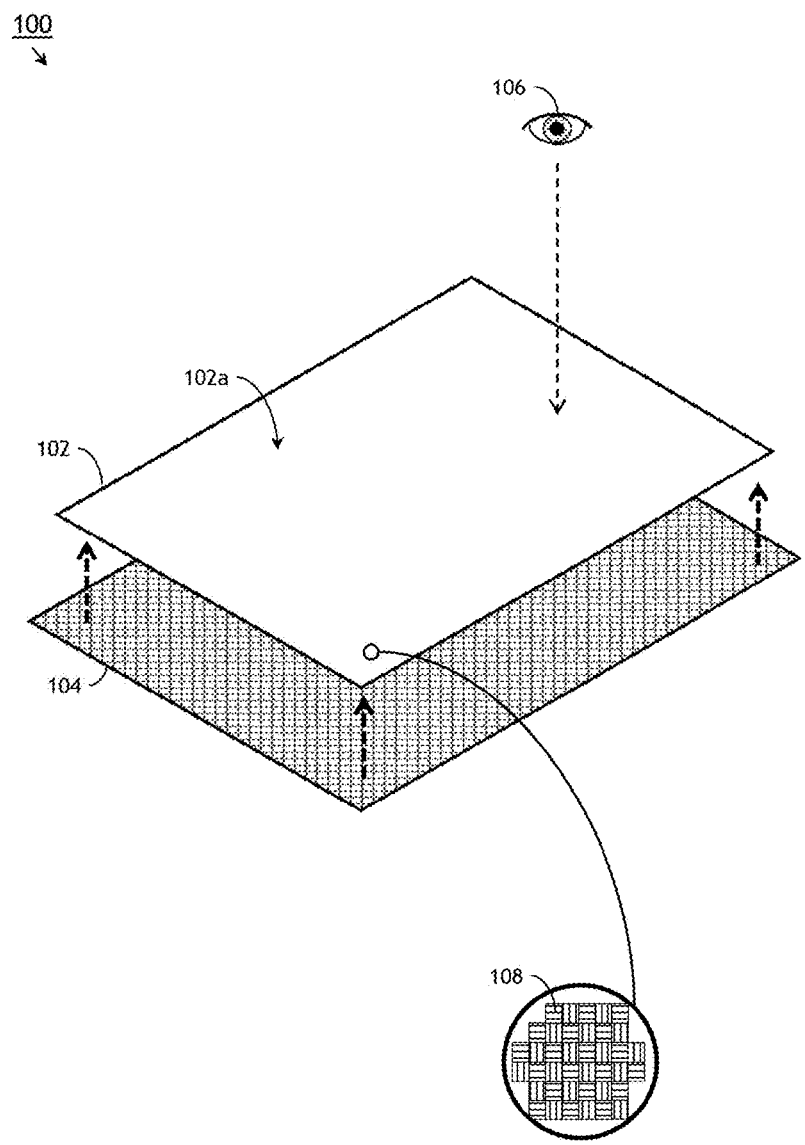
FIG. 1A is an environmental view of an emissive display unit according to embodiments of the inventive concepts disclosed herein.
Figure 1B:
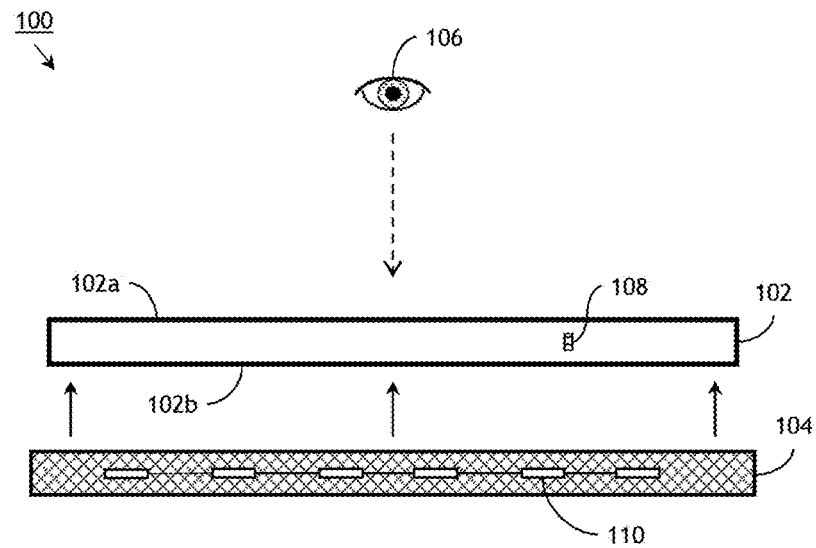
FIG. 1B is a side view of an emissive display unit according to embodiments of the inventive concepts disclosed herein.
Figure 1C:
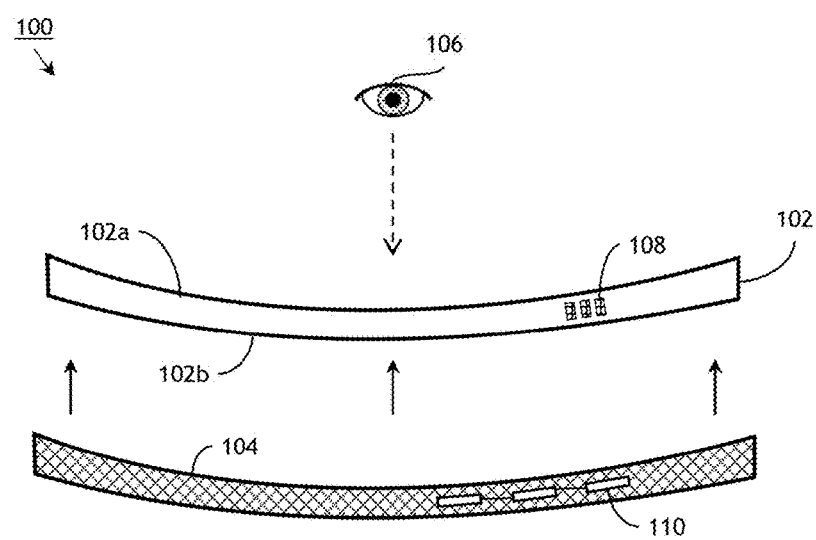
FIG. 1C is a side view of an emissive display unit according to embodiments of the inventive concepts disclosed herein.

Referring to FIGS. 1A and 1B, an emissive display unit 100 according to embodiments of the inventive concepts disclosed herein may include a display substrate 102 and a sensor substrate 104. The display substrate 102 may include a front surface 102a proximate (ex.—facing) the pilot or viewer 106, whereon images are displayed by the emissive display unit 100, and a rear surface 102b facing away from the viewer. An example of a display substrate 102, incorporating multiple sandwiched layers (between the front surface 102a and the rear surface 102b) including a plurality of emissive devices 108, is disclosed by related application Ser. No. 14/724,984. Each emissive device 108 may compare to an individual pixel visible to the viewer 106 via the front surface 102a, with variances in color defined by the emissive output of red materials, green materials, blue materials, and variances in brightness defined by variances in the current supplied to the emissive devices 108. The sensor substrate 104 may be attached to (ex.—bonded to, adhered to, overlaid onto, printed onto) the rear surface 102b of the display substrate 102 by any appropriate chemical or mechanical means. Accordingly, an emissive display unit (e.g., including a display substrate 102 but not configured for touch sensing) may be retrofitted into an emissive display unit 100 via the attachment of a sensor substrate 104 to the rear surface 102b. The sensor substrate 104 may incorporate a network of interconnected touch sensors 110, which may include four-wire, five-wire, nine-wire, or any appropriate digital resistive or capacitive touch sensors capable of detecting pressure applied to the front surface 102a of the display substrate 102. Referring also to FIG. 1C, the display substrate 102 and the sensor substrate 104 of the emissive display unit 100 may include flexible substrates configured to bend along one or more axes as well as non-planar substrates fashioned into convex, concave, or otherwise curved shapes.

Figure 2A:
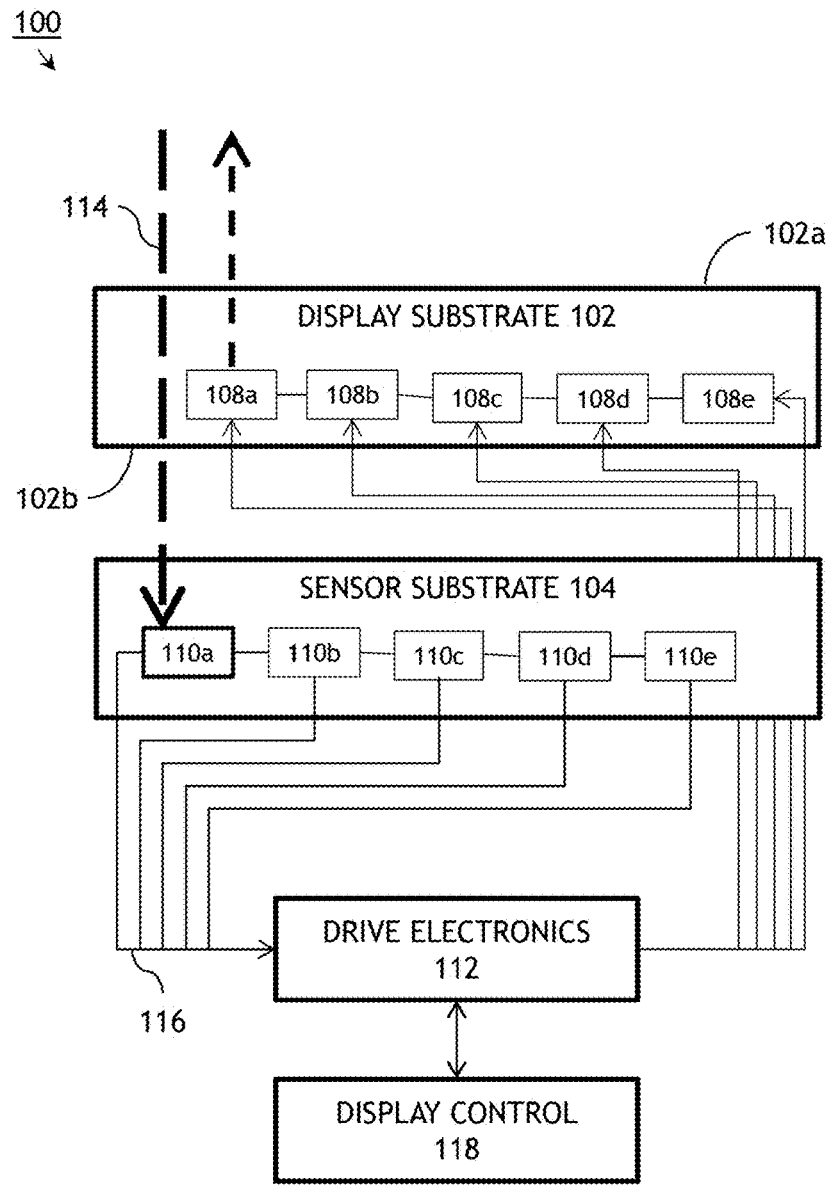
FIG. 2A is a block diagram of an emissive display unit according to embodiments of the inventive concepts disclosed herein.
Figure 2B:
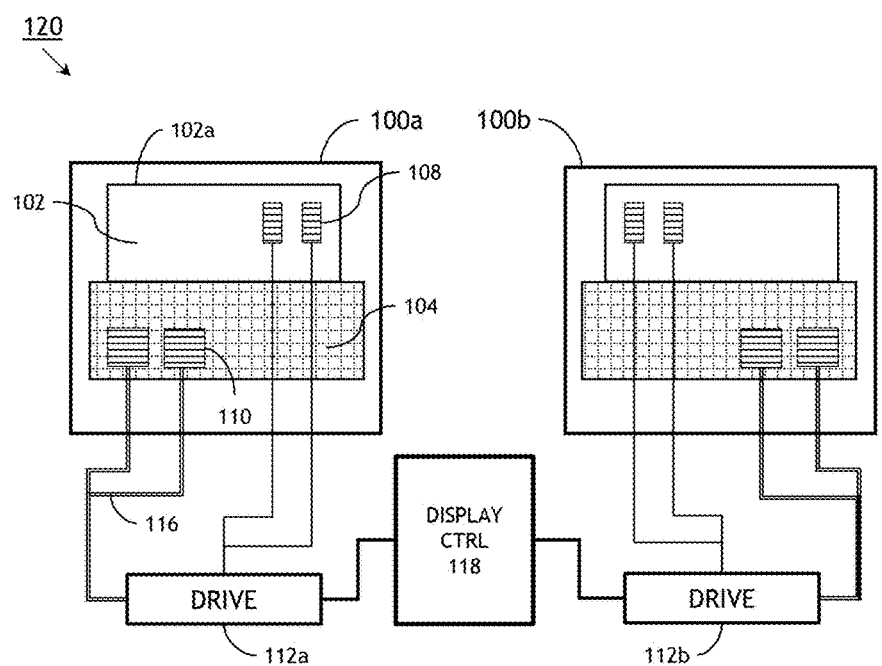
FIG. 2B is a block diagram of an avionics display system incorporating multiple emissive display units according to embodiments of the inventive concepts disclosed herein.
Figure 2C:
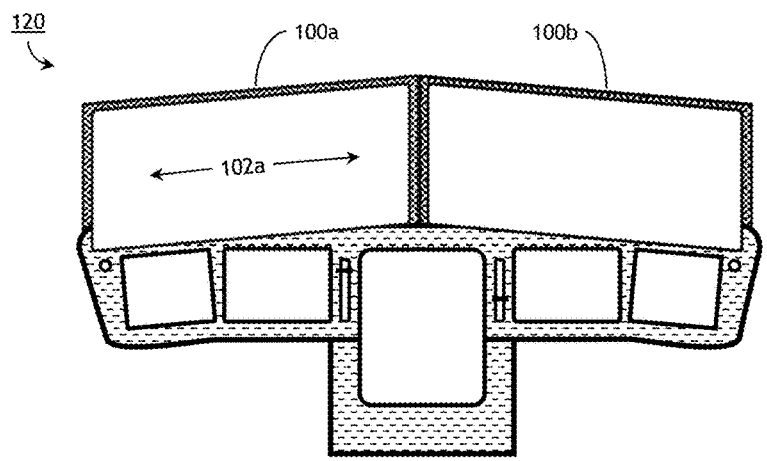
FIG. 2C is an environmental view of an avionics display system incorporating multiple emissive display units according to embodiments of the inventive concepts disclosed herein.
Figure 3A:
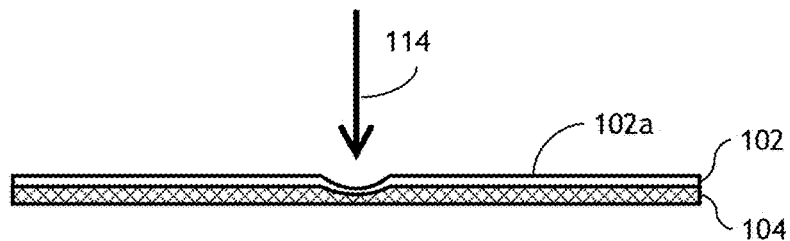
FIG. 3A is a diagrammatic side view of an emissive display unit according to embodiments of the inventive concepts disclosed herein.

Referring also to FIGS. 2A, 2B, and 3A, the sensor substrate 104 may be attached to the rear surface 102b of the display substrate 102 such that one or more touch sensors 110 of the sensor substrate may detect pressure (114) applied to the front surface 102a by one or more fingers of a pilot or viewer (not shown), or by a stylus or similar object manipulated by the pilot or viewer. The array of touch sensors 110 incorporated by the sensor substrate 104 may include capacitive sensors configured to detect a combination of body capacitance, pressure intensity, and pressure duration applied by one or more fingers. The network of touch sensors 110 may include resistive sensors configured to detect pressure applied to the front surface 102a by one or more fingers as well as a stylus, pen, pencil, or similar object. The touch sensors 110 may register this pressure contact to the touchscreen drive electronics 112 via a network of interconnect traces 116. Based at least in part on information received from the touch sensors 110, the emissive display unit 100 may generate images to be displayed on the front surface 102a via the network of emissive devices 108. The touchscreen drive electronics 112 may include one or more sets of drive electronics configured to control the emissive devices 108 of the emissive display unit 100. Alternatively, the touchscreen drive electronics 112 may be physically partitioned from the drive electronics for the emissive display unit 100 and/or the emissive devices 108 (i.e., the two sets of drive electronics may be housed on separate circuit assemblies) although the touchscreen drive electronics 112 may be communicatively coupled to the drive electronics of the emissive display unit or the emissive devices. In some embodiments, referring specifically to FIGS. 2B and 2C, the emissive display unit 100 may be incorporated into an avionics display system 120 including multiple emissive display units 100 and installable in an aircraft cockpit or elsewhere aboard an aircraft or similar mobile platform. For example, a set of touchscreen drive electronics 112a, 112b for each emissive display unit 100a, 100b may be connected to, and at least partially controlled by, a central avionics display control system 118.

Figure 3B:
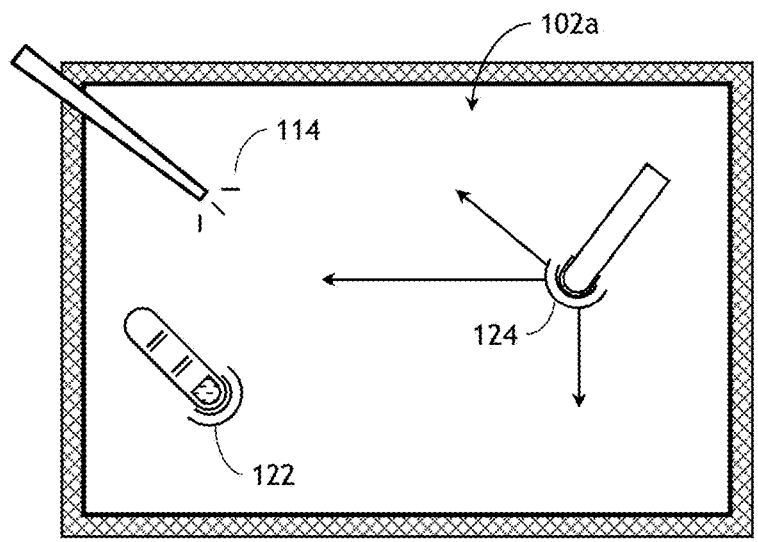
FIG. 3B is a diagrammatic forward view of an emissive display unit according to embodiments of the inventive concepts disclosed herein.

Referring to FIGS. 3A and 3B, a pilot or viewer 106 may apply pressure to the front surface 102a of the display substrate 102 in a variety of ways. For example, the pilot or viewer 106 may reduce or enlarge the size of a multifunctional window (MFW) displayed on the front surface 102a, the multifunctional window corresponding to a particular avionics function or set of functions controllable through the emissive display unit 100, or reposition a MFW on the front surface 102a, depending on the precise pressure contact applied. For example, the pilot or viewer (not shown) may press one or more fingers (or a stylus or similar object, such as a gloved finger compatible with a touchscreen) substantially perpendicular to the plane of the front surface 102a, as shown by FIG. 3A. The pilot or viewer may tap (114) the one or more fingers (or styli, gloved fingers, or other objects) to the front surface 102a, pressing and subsequently removing the one or more fingers from the front surface 102a. In the alternative, the pilot or viewer may generate a different response from the emissive display unit 100 (e.g., generating a MFW or causing the MFW to display an associated menu) by pressing and holding the one or more fingers (122) to the front surface 102a until a response is generated and displayed on the front surface 102a by the emissive display unit 100. In addition, the pilot or viewer may press one or more fingers (or objects) to the front surface 102a and swipe (124) the one or more fingers in a vertical, horizontal, or diagonal direction along the front surface (e.g., to resize or reposition a MFW displayed by the emissive display unit 100).

Figure 4A:
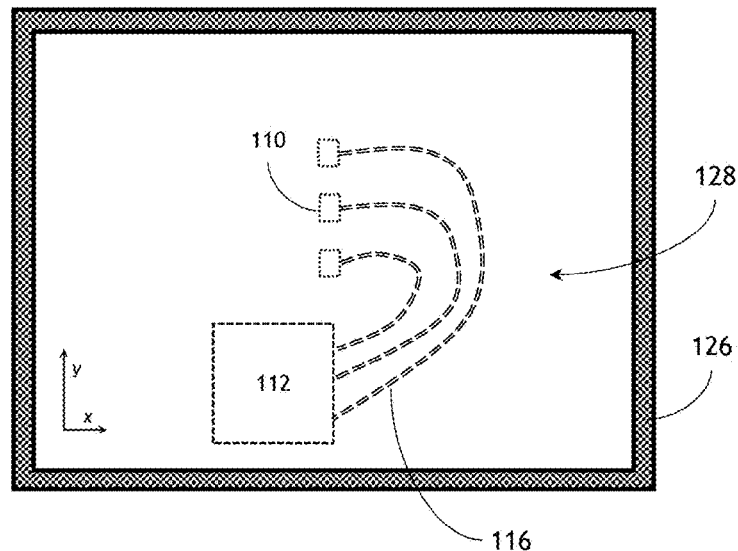
FIG. 4A is a forward view of an emissive display unit according to embodiments of the inventive concepts disclosed herein.
Figure 4B:
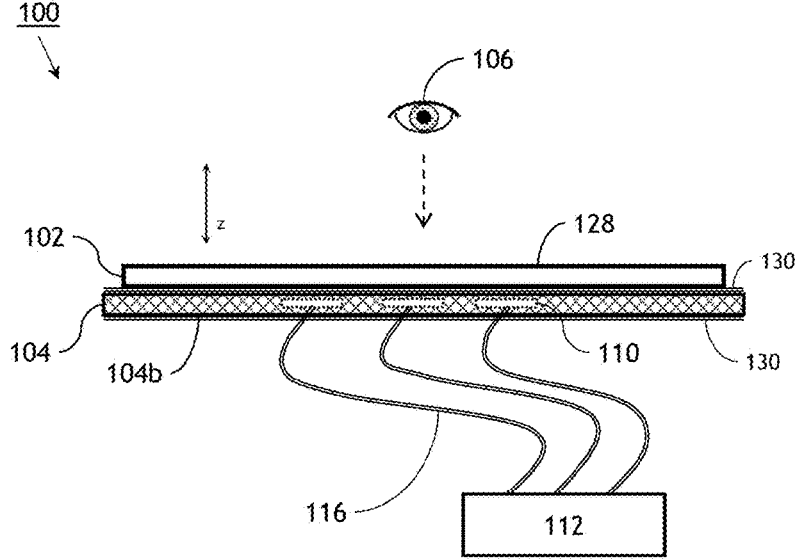
FIG. 4B is a side view of an emissive display unit according to embodiments of the inventive concepts disclosed herein.

Referring to FIGS. 4A and 4B, an emissive display unit 100 according to embodiments of the inventive concepts disclosed herein may route the network of interconnect traces 116 (from the touch sensors 110 of the sensor substrate 104 to the touchscreen drive electronics 112) behind the rear surface 104b of the sensor substrate 104, e.g., substantially parallel to the z-axis of the emissive display unit 100, rather than parallel to the x and y axes. Routing the interconnect traces 116 behind the emissive display unit 100 may result in more favorable parameters for the border area 126 surrounding the active display area 128 (the active display area corresponding to the front surface 102a of the display substrate 102). For example, the border area 126 may be reduced in overall size, and the size of the border area may not be a function of the size of the active display area 128. Referring specifically to FIG. 4B, the front surface 104a and the rear surface 104b of the sensor substrate 104 may include one or more metallized layers 130 thermally coupled to, and configured to disperse heat from, the display substrate 102 of the emissive display unit 100 by providing a low thermal resistance path for heat to spread from the emissive devices 108 along the front surface and the rear surface of the sensor substrate.

Figure 5:
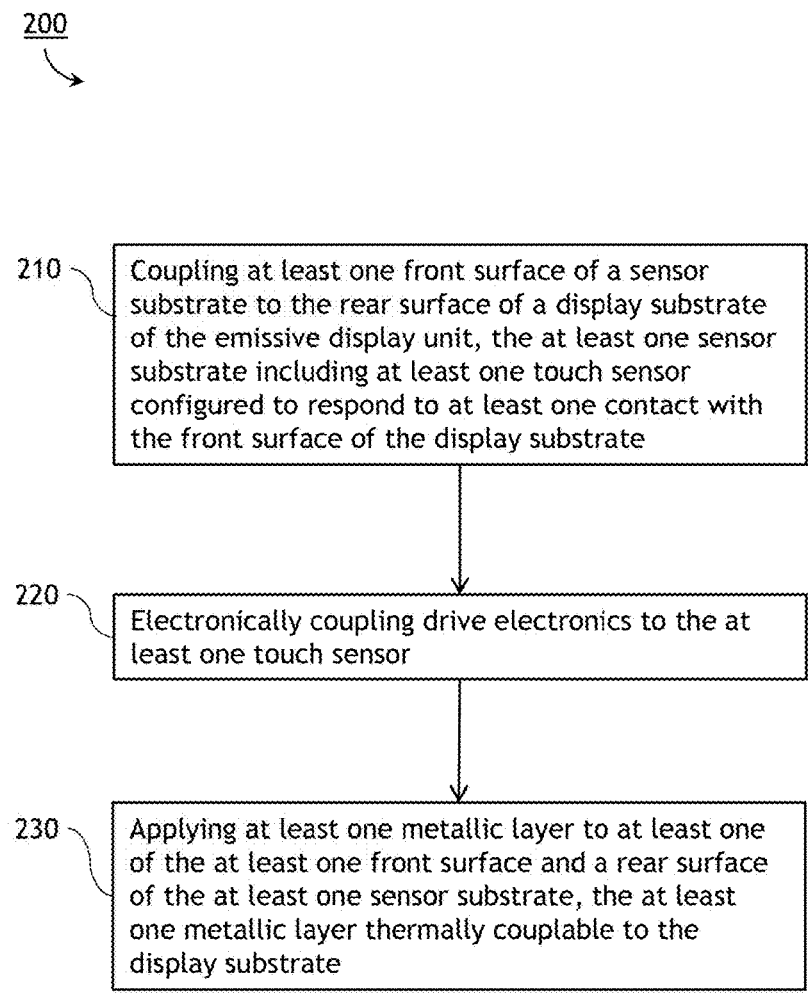
FIG. 5 is a process flow diagram illustrating a method according to embodiments of the inventive concepts disclosed herein.

FIG. 5 illustrates a method 200 for repurposing an emissive display unit 100, the emissive display unit including at least one display substrate 102 having a plurality of emissive devices 108, the emissive display unit 100 configured to display at least one image on the front surface 102a of the display substrate via the plurality of emissive devices according to embodiments of the inventive concepts disclosed herein.

At a step 210, at least one front surface 104a of a sensor substrate 104 is coupled to the rear surface 102b of the display substrate 102, the sensor substrate 104 including at least one touch sensor 110 configured to respond to at least one contact 114, 122, 124 of a finger, gloved finger, stylus, or similar object with the front surface 102a of the display substrate 102. The touch sensors 110 may include digital resistive or capacitive touch sensors. The front surface 104a of the sensor substrate 104 may be coupled to the rear surface 102b of the display substrate 102 by chemical bonding, mechanical overlay, three-dimensional printing, or any other appropriate chemical or mechanical means.

At a step 220, the touchscreen drive electronics 112 are electronically coupled to the at least one touch sensor 110. For example, the touchscreen drive electronics 112 may be coupled to the touch sensors 110 via a network of interconnect traces 116 routed behind the rear surface 104b of the sensor substrate 104.

In some embodiments, the method 200 includes an additional step 230. At a step 230, one or more metallic layers 130 may be applied to the front surface 104a and/or the rear surface 104b of the sensor substrate 104, the metallic layers 130 thermally couplable to the display substrate 102. For example, the metallic layers 130 may serve to disperse heat from the display substrate 102 or from the emissive devices 108 incorporated therein.

While particular aspects of the inventive concepts disclosed herein have been shown and described, it will be apparent to those skilled in the art that, based upon the teachings herein, changes and modifications may be made without departing from the scope of the inventive concepts disclosed herein and their broader aspects and, therefore, the appended claims are to encompass within their scope all such changes and modifications as are within the broad scope of the inventive concepts disclosed herein.

I claim:

1. An avionics system, comprising:
 a display substrate having a plurality of emissive devices, a front display substrate surface, and a rear display substrate surface, the display substrate configured to display at least one image on the front display substrate surface via the plurality of emissive devices;
 at least one sensor substrate including a front sensor substrate surface coupled to the rear display substrate surface, a rear sensor substrate surface, and at least one touch sensor configured to detect at least one contact with the front display substrate surface;
 a first heat dispersal layer coupled to the front sensor substrate surface, and a second heat dispersal layer coupled to the rear sensor substrate surface, wherein the first heat dispersal layer and the second heat dispersal layer are thermally coupled to the display substrate to disperse heat and provide a low thermal resistance path for the heat to spread from the plurality of emissive devices;
 drive electronics electronically coupled to the at least one touch sensor and at least one emissive device of the plurality of emissive devices, wherein the drive electronics are electronically coupled to the at least one touch sensor via a first set of at least one interconnect trace routed through the first heat dispersal layer, the second heat dispersal layer, and the rear sensor substrate surface of the at least one sensor substrate, wherein the drive electronics are electronically coupled to the at least one emissive device of the plurality of emissive devices via a second set of at least one interconnect trace routed through the second heat dispersal layer and the rear sensor substrate surface of the at least one sensor substrate, the drive electronics configured to drive the plurality of emissive devices to display the at least one image on the front display substrate surface in response to the detected at least one contact with the front display substrate surface; and
 a central avionics display system communicatively coupled to the drive electronics.

2. The avionics system of claim 1, wherein the display substrate is configured to display the at least one image based on the at least one contact being a first type of contact or a second type of contact, and wherein the first type of contact is of longer duration than the second type of contact.

3. The avionics system of claim 1, wherein the plurality of emissive devices includes at least one organic light-emitting diode (OLED).

4. The avionics system of claim 1, wherein the at least one touch sensor includes at least one of a digital resistive sensor and a capacitive sensor.

5. The avionics system of claim 1, wherein the front sensor substrate surface includes at least one additional heat dispersal layer layer thermally coupled to the display substrate to disperse heat and provide a low thermal resistance path for the heat to spread from the plurality of emissive devices.

6. The avionics system of claim 2, wherein the at least one contact comprises the first type of contact and includes at least one of touching and holding the at least one finger to the front display substrate surface and sliding the at least one finger along the front display substrate surface.

7. The avionics system of claim 2, wherein the at least one contact comprises the second type of contact and includes tapping at least one object to the front display substrate surface.

8. The avionics system of claim 1, wherein the drive electronics are configured to move, enlarge, or reduce the size of a multifunctional window (MFW) displayed in the at least one image on the front display substrate surface in response to the detected at least one contact with the front display substrate surface.

9. The avionics system of claim 1, wherein the display substrate and the at least one sensor substrate include at least one non-planar substrate.

10. An avionics display system comprising:
 a display substrate having a plurality of emissive devices, the display substrate having a front display substrate surface and a rear display substrate surface, the at least one emissive display unit configured to display at least one image on the front display substrate surface via the plurality of emissive devices;

at least one sensor substrate including a front sensor substrate surface bonded to the rear display substrate surface, a rear sensor substrate surface, and at least one touch sensor configured to respond to at least one pressure contact with the front display substrate surface;

a first heat dispersal layer coupled to the front sensor substrate surface, and a second heat dispersal layer coupled to the rear sensor substrate surface, wherein the first heat dispersal layer and the second heat dispersal layer are thermally coupled to the display substrate;

drive electronics coupled to the at least one touch sensor and at least one emissive device of the plurality of emissive devices, wherein the drive electronics are coupled to the at least one emissive device by a first set of at least one interconnect trace routed behind or through the first heat dispersal layer, the second heat dispersal layer, and the rear sensor substrate surface of the at least one sensor substrate, wherein the drive electronics are electronically coupled to the at least one emissive device of the plurality of emissive devices via a second set of at least one interconnect trace routed through the second heat dispersal layer and the rear sensor substrate surface of the at least one sensor substrate, the drive electronics configured to drive the plurality of emissive devices to display the at least one image on the front display substrate surface in response to the detected at least one pressure contact with the front display substrate surface; and a central avionics display control system communicatively coupled to the drive electronics.

11. The avionics display system of claim 10, wherein the at least one emissive display unit is configured to display the at least one image based on the at least one pressure contact being a first type of contact or a second type of contact, and wherein the first type of contact is of longer duration than the second type of contact.

12. The avionics display system of claim 11, wherein the at least one pressure contact comprises the first type of contact and includes at least one of touching and holding the at least one finger to the at least one front display substrate surface and sliding the at least one finger along the at least one front display substrate surface, and wherein the image includes a menu.

13. The avionics display system of claim 11, wherein the at least one pressure contact comprises the second type of contact and includes tapping at least one object to the at least one front display substrate surface.

14. The avionics display system of claim 10, wherein the plurality of emissive devices includes at least one organic light-emitting diode (OLED).

15. The avionics display system of claim 10, wherein the at least one touch sensor includes at least one of a digitally resistive touch sensor and a capacitive touch sensor.

16. The avionics display system of claim 10, wherein the front sensor substrate surface includes at least one additional heat dispersal layer thermally coupled to the at least one display substrate.

17. The avionics display system of claim 10, wherein one or more of the at least one emissive display unit includes at least one of a flexible sensor substrate, a non-planar display substrate, and a non-planar sensor substrate.

18. A method for repurposing an avionics emissive display unit coupled to drive electronics, the method comprising:

coupling a first heat dispersal layer to a front surface of a sensor substrate;

coupling the first heat dispersal layer to a rear surface of a display substrate of the avionics emissive display unit, the sensor substrate including at least one touch sensor configured to respond to at least one contact with a front surface of the display substrate based on a type of the at least one contact;

coupling a second heat dispersal layer to a rear surface of the sensor substrate, the first heat dispersal layer and the second heat dispersal layer thermally coupled to the display substrate to disperse heat and provide a low thermal resistance path for the heat to spread from the display substrate;

electronically coupling drive electronics to the sensor substrate by routing a first set of at least one interconnect trace through the second heat dispersal layer and the rear surface of the sensor substrate to the at least one touch sensor, electronically coupling the drive electronics to the display substrate by routing a second set of at least one interconnect trace through the first heat dispersal layer, the second heat dispersal layer, and the rear surface of the sensor substrate to at least one emissive device of the display substrate, the drive electronics configured to drive a plurality of emissive devices to display at least one image on the front surface of the display substrate; and fixedly mounting the avionics emissive display unit in an aircraft cockpit.

19. The method of claim 18, wherein coupling a front surface of a sensor substrate to a rear surface of a display substrate of the avionics emissive display unit includes:

coupling the at least one front surface of the sensor substrate to the rear surface of the display substrate via at least one of bonding, adhering, overlaying, or printing.

20. The method of claim 18, further comprising:

applying at least one additional heat dispersal layer to the front surface of the sensor substrate, the at least one additional heat dispersal layer thermally coupled to the display substrate.

* * * * *